United States Patent
Accapadi et al.

(10) Patent No.: US 7,698,529 B2
(45) Date of Patent: Apr. 13, 2010

(54) METHOD FOR TRADING RESOURCES BETWEEN PARTITIONS OF A DATA PROCESSING SYSTEM

(75) Inventors: Jos Manuel Accapadi, Austin, TX (US); Andrew Dunshea, Austin, TX (US); Diane Garza Flemming, Pflugerville, TX (US); Catherine Moriarty Nunez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 11/621,637

(22) Filed: Jan. 10, 2007

(65) Prior Publication Data

US 2008/0168457 A1 Jul. 10, 2008

(51) Int. Cl.
*G06F 13/00* (2006.01)
(52) U.S. Cl. .................................. 711/173; 711/209
(58) Field of Classification Search .............. 711/173, 711/209
See application file for complete search history.

(56) References Cited

U.S. PATENT DOCUMENTS

| | | | |
|---|---|---|---|
| 4,476,522 A | 10/1984 | Bushaw et al. | |
| 5,970,495 A | 10/1999 | Baru et al. | |
| 6,424,992 B2 | 7/2002 | Devarakonda et al. | |
| 7,228,546 B1 * | 6/2007 | McCarthy et al. | 718/104 |
| 7,234,037 B2 * | 6/2007 | Errickson et al. | 711/202 |
| 2003/0037092 A1 * | 2/2003 | McCarthy et al. | 709/104 |
| 2005/0039183 A1 * | 2/2005 | Romero et al. | 718/100 |
| 2005/0114623 A1 * | 5/2005 | Craddock et al. | 711/200 |

FOREIGN PATENT DOCUMENTS

EP 0309428 A3 3/1989

OTHER PUBLICATIONS

"CPU Resource Distribution by POWER Hypervisor and Partition Load Manager", IBM Redbooks, pp. 1-5, retrieved Nov. 13, 2006. http://www.redbooks.ibm.com/abstracts/tips0427.html?open.

(Continued)

*Primary Examiner*—Reba I Elmore
(74) *Attorney, Agent, or Firm*—Yee & Associates, P.C.; Matthew W. Baca

(57) ABSTRACT

A method is provided for a data processing system configured to include multiple logical partitions, wherein resources of the system are selectively allocated among respective partitions. In the method, an entity such as a Partition Load Manager or a separate background process is used to manage resources based on locality levels. The method includes the step of evaluating the allocation of resources to each of the partitions at a particular time, in order to select a partition having at least one resource considered to be of low desirability due to its level of locality with respect to the selected partition. The method further comprises identifying each of the other partitions that has a resource matching the resource of low desirability, and determining the overall benefit to the system that would result from trading the resource of low desirability for the matching resource of each of the identified partitions. Resources are reallocated to trade the resource of low desirability for the matching resource of the identified partition that is determined to provide the greatest overall benefit for the system, provided that at least some overall system benefit will result from the reallocation.

20 Claims, 3 Drawing Sheets

OTHER PUBLICATIONS

"W3 Standards", IBM, pp. 1-6, retrieved Nov. 13, 2006. http://w3.ibm.com/standards/.

"Load balancing", pp. 1-2, retrieved Sep. 19, 2005. http://www.cmmp.ucl.ac.uk/~conquest/MM/node15.html.

"Load-balancing Active Processors", HP invent, pp. 1-2, retrieved Nov. 13, 2006. http://docs.hp.com/en/B9073-90040/ch04s07.html.

"Project Proposal: On the Benefits of Work Stealing in Shared-memory Multiprocessors", pp. 1-4, retrieved Nov. 30, 2006. http://www.cs.cmu.edu/~acw/15740/proposal.html.

* cited by examiner

METHOD FOR TRADING RESOURCES BETWEEN PARTITIONS OF A DATA PROCESSING SYSTEM

BACKGROUND OF THE INVENTION

1. Field of the Invention

The invention disclosed and claimed herein generally pertains to a method for trading or exchanging resources among logical partitions (LPARs) in a data processing system, wherein access to resources such as memory may be non-uniform with respect to latency or access time. More particularly, the invention pertains to a method of the above type wherein resources are traded to improve efficiency in the use of available resources by respective partitions. Even more particularly, the invention pertains to a method of the above type wherein trading and reallocation of resources among respective partitions is guided by a policy directed to improve overall system quality in the use of resources by respective partitions.

2. Description of the Related Art

Increasingly, large symmetric multi-processor data processing systems are not being used as single large data processing systems. Instead, these types of data processing systems are being partitioned and used as smaller systems, also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These resources can be allocated, and may include one or more architecturally distinct processors and their interrupt management areas, regions of system memory, and input/output (I/O) adapter bus slots. The resources of the partition are represented to the operating system image by the platform firmware. Hardware resources in partitioned data processing systems may include, for example, input/output (I/O) adapters, CPUs, non-volatile random access memory (NVRAM), and hard disk drives. Hardware resources can be moved from one partition to another, as needs change.

When a partition is created, several different memory regions may be called upon to provide partition memory. Depending on the hardware, it is possible that each of these memory regions will have different latencies, or access times. Some of these latencies may be comparatively short, where the memory regions are local to the partition. Other memory regions, that are distant from the partition, will have latencies that are excessively long. For some work loads, this can be undesirable. For example, if the central processing unit (CPU) of a partition is assigned memory on the same card as the CPU, the memory is local to the CPU, and the time required for the CPU to access the memory is comparatively short. On the other hand, if the memory is on a different card, the CPU must go through a buffer to access the memory, so that latency will be longer. If the CPU is engaged in activity such as extensive computations, wherein locality between the CPU and memory is important, the quality using the remote memory will be less than the quality using the local memory. On the other hand, if the CPU was only accessing I/O devices, locality may not be important. Moreover, there can be levels of locality or remoteness for a memory region. This is illustrated by considering alternative arrangements, wherein the memory is attached to the CPU cache controller, the memory is not directly attached to the controller but is in the same node as the CPU, or the memory is in the same frame as the CPU but access to the memory must go through one or more buffers.

It has been found that non-uniformity in memory access time, as discussed above, can significantly affect the overall throughput of a partition system. Frequently, discrepancies are noted in the performance of different logical partitions that are running the same workload. For example, a 10% performance difference was observed between two partitions which appeared identically configured, in regard to their respective amounts of memory, CPUs and operating systems. In addition, moving a CPU into a partition can increase the number of remote memory accesses, if the partition is not local with respect to the memory allocations. Similarly, the number of remote accesses could be increased if the CPU was taken from a partition that was local with respect to some or all of the allocated memory.

Notwithstanding undesirable effects such as those described above, which can result from variations in the comparative locality of memory resources, current practice generally requires that once the memory has been allocated to a partition and the partition is running, the partition is expected to make the best use of whatever resources it has received. Very often, this means distributing the memory access across the allocations, which creates an average memory latency value. The average memory latency value depends on the mix of access times and on how much memory each region contributed. As a further example of current practice, during a dynamic reassignment memory could be given away to a more needy partition. In this situation, an arbitrary range of memory is taken from one partition and given to another partition. Locality is not considered in the sense that the request to take or steal memory is a targeted operation against a particular partition. Locality of the memory is not taken into account in this situation.

It is anticipated that overall quality of a partitioned system could be improved, and resources could be used with significantly greater efficiency, if the allocation of resources to respective partitions took into account the comparative importance of resource locality.

SUMMARY OF THE INVENTION

Embodiments of the invention provide a partitioned system wherein a "desirability of resource" policy lists a desired level of locality for each resource associated with affinity regions such as CPU and memory. For each partition, the desired locality level for respective resources is included in a range of levels extending from highly desired to unimportant. As used herein, "resource locality level" is a numerical value that provides a comparative measure of how close or remote a resource is with respect to its partition. Usefully, embodiments of the invention can use Partition Load Manager (PLM) of a partition system to manage resources based on locality level. The PLM provides a centralized infrastructure of policy-based resource reallocation on the Hardware Management Consult (HMC). However, entities other than the PLM, such as a separate daemon or background process, can also be used to manage resources based on locality levels. In one embodiment, directed to a method for a data processing system configured to include multiple logical partitions, resources of the system are selectively allocated among respective partitions. The method includes the step of evaluating the allocation of resources to each of the partitions at a particular time, in order to select a partition having at least one resource considered to be of low desirability due to its level of locality with respect to the selected partition. The method further comprises identifying each of the other partitions that has a resource matching the resource of low desirability, and determining the overall benefit to the system that would result from trading the resource of low desirability for the matching resource of each of the identified partitions. Resources are reallocated to trade the resource of low desirability for the matching resource of the identified partition that is determined to provide the greatest overall benefit for the system, provided that at least some overall system benefit will result from the reallocation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
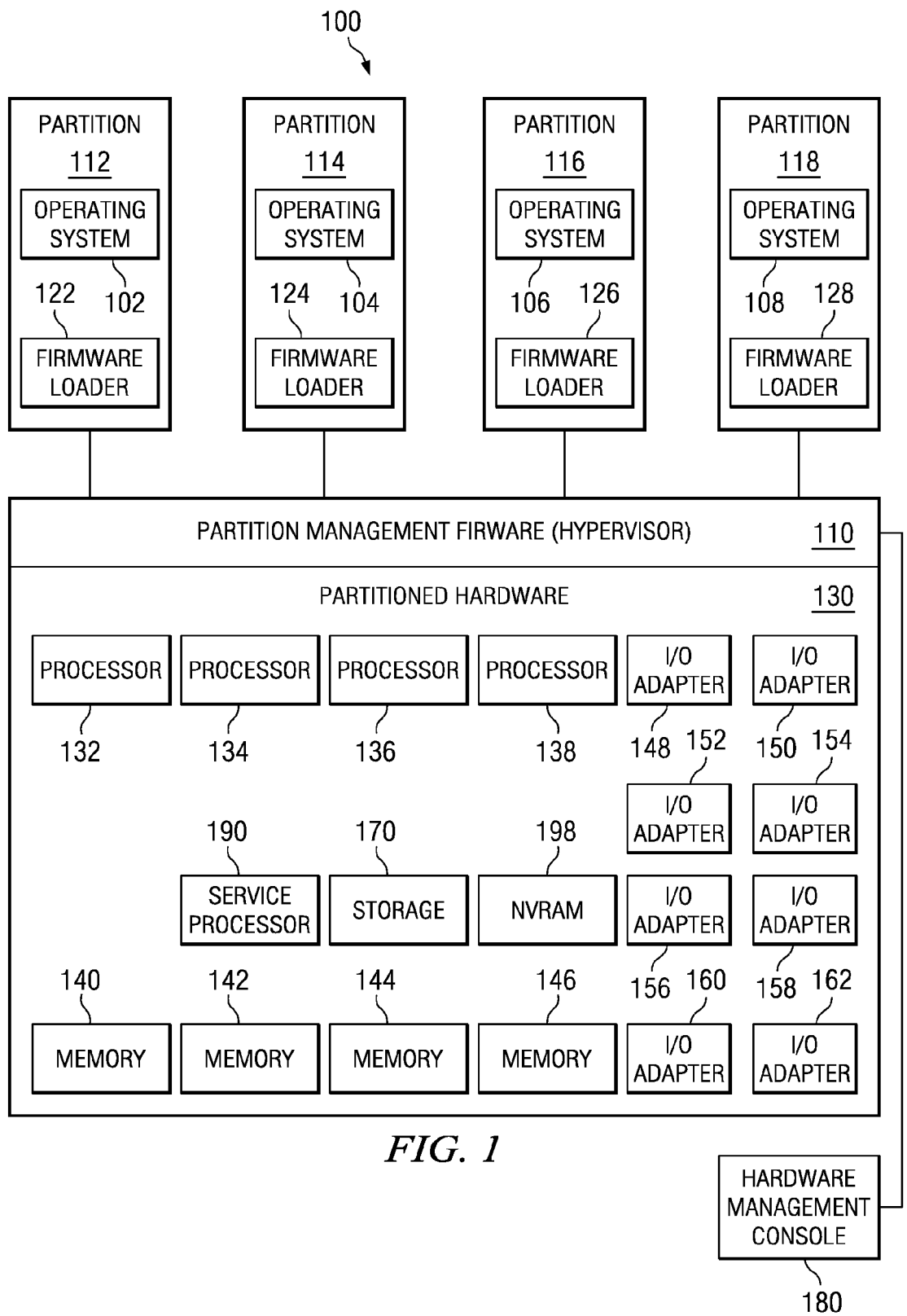
FIG. 1 is a block diagram showing an exemplary logical partition platform in which embodiments of the invention may be implemented.

With reference to FIG. 1, a block diagram of an exemplary logical partitioned platform 100 is depicted in which the present invention may be implemented. The hardware in logically partitioned platform 100 may be implemented as, for example, data processing system 400, described hereinafter in connection with FIG. 4. Logically partitioned platform 100 includes partitioned hardware 130, operating systems 102, 104, 106, 108 and hypervisor 110. Operating systems 102, 104, 106 and 108 may be multiple copies of a single operating system, or may be multiple heterogeneous operating systems simultaneously run on platform 100. These operating systems may be implemented using OS/400, which is designed to interface with a hypervisor. Operating systems 102, 104, 106 and 108 are located in partitions 112, 114, 116 and 118, respectively. Additionally, these partitions respectively include firmware loaders 122, 124, 126 and 128. When partitions 112, 114, 116 and 118 are instantiated, a copy of open firmware is loaded into each partition by the hypervisor's partition manager. The processors associated or assigned to the partitions are then dispatched to the partitions' memory to execute the partition firmware.

Partitioned hardware 130 includes a plurality of processors 132-138, a plurality of system memory units 140-146, a plurality of input/output (I/O) adapters 148-162, and a storage unit 170. Partition hardware 130 also includes service processor 190, which may be used to provide various services, such as processing of errors in the partitions. Each of the processors 132-138, memory units 140-146, NVRAM 198, and I/O adapters 148-162 may be assigned to one of multiple partitions within logically partitioned platform 100, each of which corresponds to one of operating systems 102, 104, 106 and 108.

Partition management firmware (hypervisor) 110 performs a number of functions and services for partitions 112, 114, 116 and 118 to create and enforce the partitioning of logically partitioned platform 100. Hypervisor 110 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), electrically erasable programmable ROM (EEPROM), and non-volatile random access memory (NVRAM). Thus, hypervisor 110 allows the simultaneous execution of independent OS images 102, 104, 106 and 108 by virtualizing all the hardware resources of logically partitioned platform 100.

Operation of the different partitions may be controlled through a Hardware Management Console (Hardware Management Consult), such as HMC 180. HMC 180 is a separate distributed computing system from which a system administrator may perform various functions, including reallocation of resources to different partitions.

In an environment of the type shown in FIG. 1, it is not permissible for resources or programs in one partition to affect operations in another partition. Moreover, to be useful, the assignment of resources needs to be fine-grained.

Figure 2:
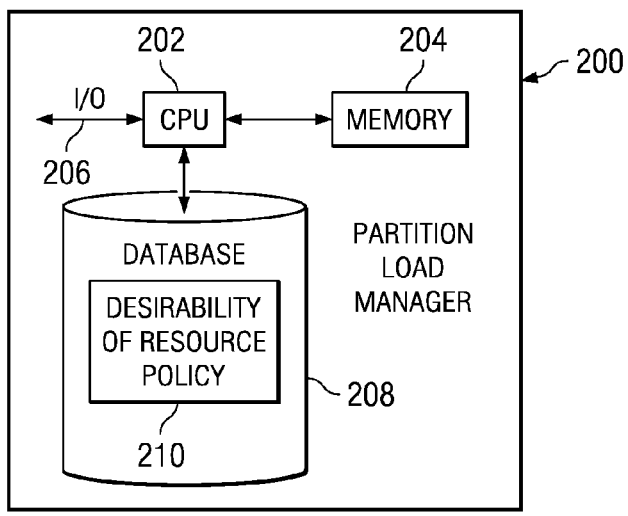
FIG. 2 is a schematic diagram showing an exemplary Partition Load Manager for use with the partitioned platform shown in FIG. 1.

Referring to FIG. 2, there is shown a Partition Load Manager (PLM) 200, which may reside for example in the Hardware Management Console (HMC) 180 of the partitioned platform shown in FIG. 1. PLM 200 is provided to implement an embodiment of the invention, by periodically evaluating the allocation of resources to respective partitions. PLM 200 is also adapted to determine whether overall quality in using the resources can be improved, by selective trades or exchanges of resources between different partitions. To carry out these tasks, PLM 200 is provided with a CPU 202, a memory 204, and an I/O bus 206. PLM 200 is further provided with a database 208, which contains a desirability of resource policy 210.

For each resource allocated to a particular partition, wherein each resource is associated with affinity regions such as CPUs and memory, policy 210 lists a desired level of locality for the resource. The desired level of resource locality is generally determined by the work load of the particular partition, and indicates how important it is for the resource to be local with respect to the partition. The level of resource locality is classified in a range extending from highly desired to unimportant. For example, if a particular partition was engaged in heavy computational effort, it would be very desirable to have the CPUs and memory close to one another. On the other hand, if the work load involved operations with I/Os, such as data transfers to and from a storage disk, latency between the CPUs and memory, and thus the level of resource locality, would be comparatively unimportant.

PLM 200 is provided with an algorithm configured to carry out the above tasks of evaluating resource allocations, and of assessing the desirability of shifting resources between partitions, in order to improve overall system quality. The algorithm is further configured to use the listed resource locality levels of a partition, as described above, to determine "minimum win" and "maximum loss" values for the partition. "Minimum win" would be a numerical value indicating the minimum benefit a partition could accept, that resulted from a change in its allocated resources. The win value would represent an increase in the level of resource locality for the partition, and would also represent the relative importance of such locality to the partition, as described above. Similarly, "maximum loss" value would be the maximum reduction in resource locality a partition could accept, and would likewise represent both the reduction in resource locality level resulting from a resource change, and the importance of locality to the partition. While alternative approaches could be followed by those of skill in the art in configuring algorithms to calculate minimum win and maximum loss values, as described above, it is considered that all such efforts would lie within the scope of the invention.

The minimum win and maximum loss values establish thresholds to limit the shifting of resources into and out of the partition. A transfer of resources will not be allowed if the benefit to the partition is too little, or if the loss to the partition is too great. Thus, the threshold values act to define a range in which the effort to enhance quality by shifting or rebalancing resources will be worthwhile. Moreover, the win and loss values for each partition are used by the algorithm to calculate a resource desirability factor for the partition. Resource desirability factor, for example, could be a ratio of the win and loss values for a partition, or could be calculated from a different relationship representing both such values. Resource desirability factors for respective partitions are needed to judge the quality of the current resource allocation set.

In accordance with a method of the invention, after carrying out an evaluation of resource allocations, the algorithm selects the partition having the lowest resource desirability factor. If there are multiple partitions sharing this position, the partition that is the least recent recipient of the resource trade is selected. The least desirable resource of the selected partition is then identified. Resources matching the undesirable resource are evaluated for all other partitions, in order to determine whether or not there would be an overall benefit in trading the identified undesirable resource for one of the matching resources. The evaluation would be based on the win/loss values for respective partitions, with the best overall match being finally chosen.

It is to be emphasized that the best match will be determined by considering the combination of win and loss values for each partition, with the desired goal being to increase the resource desirability of the selected lowest ranking partition. A useful calculation to achieve this is to take the percentage of win or loss. In the case of the win, the percentage gain will be taken. In the case of the loss, the percentage based on the total permissible loss will be used. For example, if a partition will accept a 200 point loss and the loss value is 100, 50% will be used for the loss value. The loss value will then be subtracted from the win value. It is to be stressed that this procedure takes into account both the benefits that result from a resource trade or rebalancing, and also any detrimental effects that are caused thereby.

Figure 3:
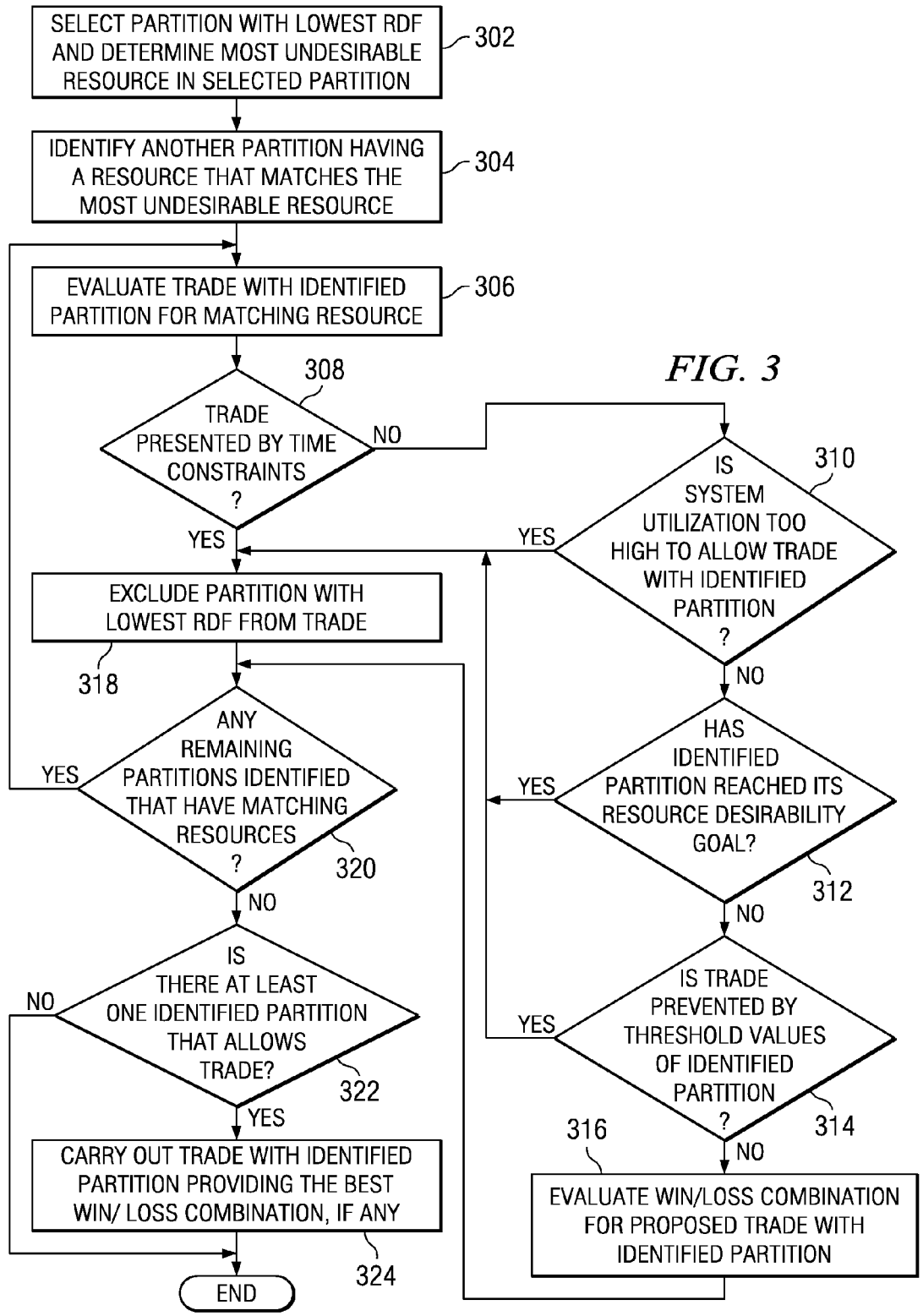
FIG. 3 is a flow chart showing steps of a method in accordance with an embodiment of the invention.

Referring to FIG. 3, there are shown steps providing further detail in carrying out the above procedure. In a useful embodiment of the invention, PLM 200 periodically evaluates the allocation of system resources to respective partitions. After each periodic evaluation, the procedure of FIG. 3 is carried out. At step 302, the partition found by the evaluation to have the lowest resource desirability factor is selected, and the most undesirable resource thereof is determined, as described above. At steps 304-306, as likewise described above, another partition is identified that has a resource matching the undesirable resource, and a trade with the identified partition for the matching resource is evaluated.

In addition to the list of resource locality levels referred to above, policy 210 of FIG. 2 is usefully provided with a set of rules. The rules are used to regulate the process of evaluating a proposed trade or exchange of resources between partitions. For example, one rule could establish time constraints, so that trades to rebalance the allocation of resources among partitions could occur only during specific time windows. Thus, at step 308 of FIG. 3, it is necessary to determine whether the proposed trade is prevented by any such time constraints.

Resource trading can be an extensive operation, and it is thus undesirable to trade resources when system utilization is high. Accordingly, a further rule could be that each partition is allowed to assign utilization levels to both its win and loss parameter values, to limit the dynamic rebalancing of resources while system utilization is high. If utilization is above a cut-off point, a partition may reserve a resource and not participate in resource exchanges for a period of time, either until the utilization drops below the cut-off value or the reservation expires. This provides a cut-off point when the partitions will not accept a request to rebalance resources due to system utilization. In view of this rule, step 310 is included in the evaluation process, to determine whether system utilization is too high to allow a trade with the identified partition.

In addition to determining a resource desirability factor for respective partitions, as described above, it can be beneficial to compute a resource desirability goal for each partition. It could then be useful for policy 210 to exclude trading between partitions that have reached their respective resource desirability goals. Partitions farthest away from their target resource desirability goal will be given preference in resource trades. Partitions which exceed their resource desirability goal may trade at a loss in order to help partitions, providing that the maximum loss threshold for the partition is not exceeded. In view of this rule, step 312 is provided, in order to determine whether the identified partition is prevented from trading because it has reached its resource desirability goal.

At step 314, it is determined whether or not the maximum and minimum threshold values of the identified partition would prevent the proposed trade to rebalance resources. If the determination at step 314 allows the process to go forward for the identified partition, the win/loss combination for the proposed trade will be evaluated as described above, at step 316.

Referring further to FIG. 3, there is shown step 320 directed to determining whether any further partitions need to be considered, in evaluating a proposed resource trade. However, there is also shown a step 318 interposed between step 320 and all affirmative decisions of step 308-314. Step 318 is provided to expressly prohibit a trade with the partition having the lowest resource desirability factor, selected at step 302.

Following step 320, if there are no partitions remaining that are identified as having matching resources, the process advances to step 322. At step 322, it is determined whether there is at least one identified partition that allows a trade. If not, the process ends. Otherwise, the process advances to step 324. The proposed resource trade or rebalance is carried out for the best win/loss combination, if any such combination was found during the evaluation process.

As a further rule, policy 210 could define whether a partition is willing to participate in live trading, or only when resource reallocation is occurring. During dynamic resource allocation, such as when memory is removed or added due to either a manual dynamic partitioning operation or automated PLM operation, the partition may allow resource reallocation based on desirability. If a partition is able participate in live trading, the rebalance of resource based on desirability will be permitted at any time.

Figure 4:
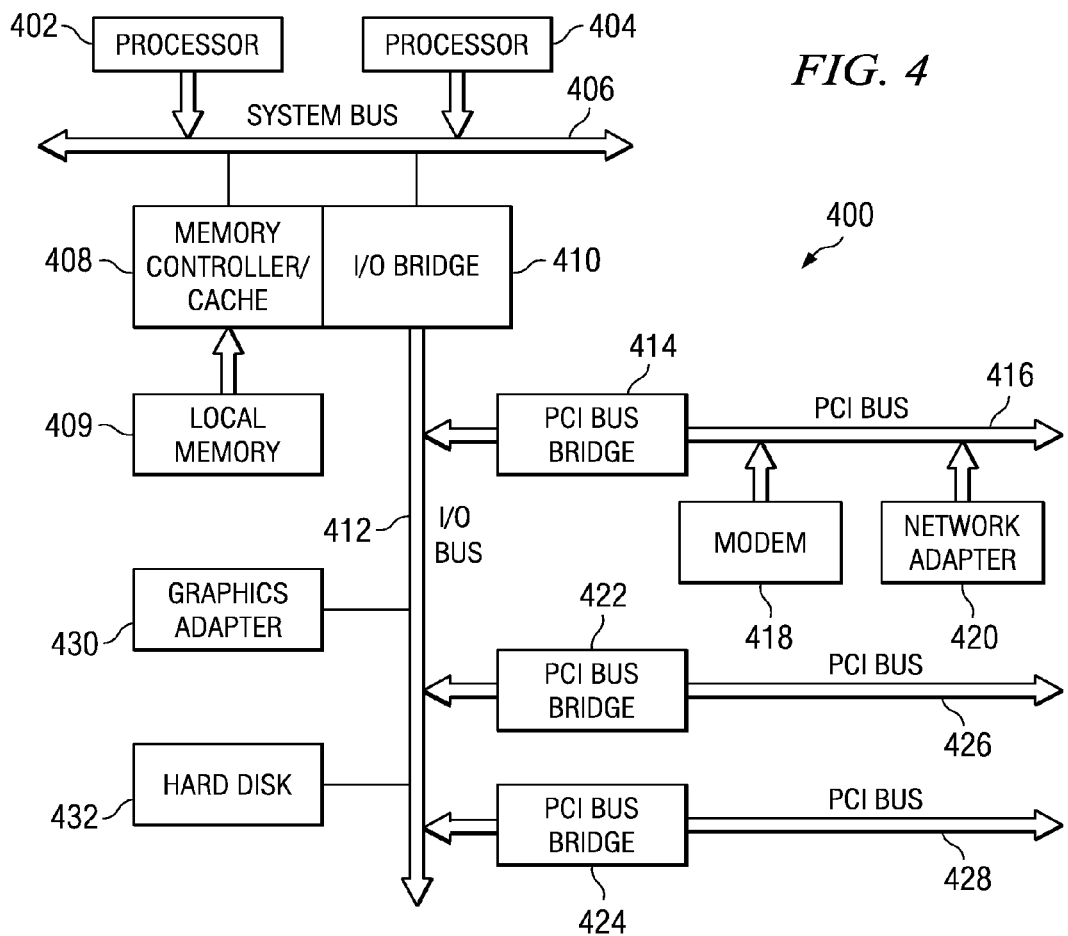
FIG. 4 is a block diagram showing a data processing system that may be partitioned as shown by FIG. 1.

Referring to FIG. 4, there is shown a block diagram depicting a data processing system 400 that may be partitioned as shown by FIG. 1 and used in implementations of the invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 408. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems may be connected to PCI bus 416. Typical PCI bus implementations will support four PCI expansion slots or add-in connectors. Communications links may be provided through modem 418 and network adapter 420 connected to PCI local bus 416 through add-in boards.

Additional PCI bus bridges 422 and 424 provide interfaces for additional PCI buses 426 and 428, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly. The depicted example is not meant to imply architectural limitations with respect to the present invention. The data processing system depicted in FIG. 4 may be, for example, an IBM RISC/System 6000 system, a product of International Business Machines Corporation in Armonk, N.Y., running the Advanced Interactive Executive (AIX) operating system. Alternatively, the operating system may be another commercially available operating system such as JavaOS For BusinessÔ or OS/2Ô, which are also available from IBM.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed:

1. In a data processing system configured to include multiple logical partitions, wherein resources of said system are selectively allocated among respective partitions, a method comprising the steps of:

assigning a resource locality level included in a range of said levels to each resource of a partition, wherein the resource locality level assigned to a given resource of a partition comprises a comparative measure of how close or remote the given resource is, with respect to its partition;

evaluating the allocation of resources to each of said partitions at a particular time, in order to select a partition having at least one resource that is determined to be of low desirability due to its level of locality with respect to said selected partition;

identifying each of the other partitions that has a resource matching said resource of low desirability;

determining the overall benefit of said system that would result from trading said resource of low desirability for the matching resource of each of said identified partitions; and reallocating said resources to trade said resource of low desirability for the matching resource of the identified partition that is determined to provide the greatest overall benefit for said system, provided that at least some overall system benefit will result from said reallocation.

2. The method of claim 1, wherein:

the resource locality level assigned to a resource of a partition comprises a numerical value that provides said comparative measure for the resource.

3. The method of claim 1, wherein:

a resource desirability factor is calculated for each partition to represent the resources allocated to the partition, the resource desirability factors for respective partitions being used to select said partition having said resource of low desirability, wherein the resource desirability factor for a given partition is calculated by first determining a minimum win value and a maximum loss value, and then determining the ratio of the maximum loss value and minimum win value.

4. The method of claim 1, wherein:

each partition is assigned win and loss values, in order to establish thresholds to selectively limit shifting of resources into and out of the partition.

5. The method of claim 1, wherein:

an entity is provided for managing allocation of resources with respect to said partitions, wherein said entity contains a policy pertaining to desirability of resources.

6. The method of claim 1, wherein:
said allocation managing entity is provided with an algorithm for periodically evaluating allocation of resources to respective partitions, and for determining whether a proposed reallocation would provide an overall benefit to said partitioned system.

7. The method of claim 6, wherein:
said algorithm determines the overall benefit to said system for a proposed trade of resources between partitions by considering both the beneficial and detrimental effects of the proposed trade.

8. The method of claim 1, wherein:
at least one of said partitions is permitted to participate in resource trades with other partitions at any time, and at least one other of said partitions is permitted to participate in resource trades with other partitions only when resource allocation is occurring.

9. The method of claim 1, wherein:
each of said partitions has a resource desirability goal associated with its allocated resources, wherein a partition that has reached its resource desirability goal does not participate in resource trades with other partitions.

10. The method of claim 1, wherein:
at least one of said partitions will not participate in resource trades with other partitions when system utilization exceeds a pre-specified utilization level.

11. In a data processing system configured to include multiple logical partitions, wherein resources of said system are selectively allocated among respective partitions, a computer program product in a computer readable storage medium comprising:
first instructions for evaluating the allocation of resources to each of said partitions at a particular time, in order to select a partition having at least one resource considered to be of low desirability due to its level of locality with respect to said selected partition;
second instructions for identifying each of the other partitions that has a resource matching said resource of low desirability;
third instructions for determining the overall benefit of said system that would result from trading said resource of low desirability for the matching resource of each of said identified partitions; and
fourth instructions for reallocating said resources to trade said resource of low desirability for the matching resource of the identified partition that is determined to provide the greatest overall benefit for said system, provided that at least some overall system benefit will result from said reallocation.

12. The computer program product of claim 11, wherein:
a resource locality level included in a range of said levels is assigned to each resource of a partition, wherein one end of said range indicates a resource locality level that is very desirable, and the other end of the range indicates a resource locality level that is unimportant.

13. The computer program product of claim 11, wherein:
a resource desirability factor is calculated for each partition to represent the resources allocated to the partition, the resource desirability factors for respective partitions being used to select said partition having said resource of low desirability.

14. The computer program product of claim 11, wherein:
each partition is assigned win and loss values, in order to establish thresholds to selectively limit shifting of resources into and out of the partition.

15. The computer program product of claim 11, wherein:
said allocation managing entity is provided with an algorithm for periodically evaluating allocation of resources to respective partitions, and for determining whether a proposed reallocation would provide an overall benefit to said partitioned system.

16. The computer program product of claim 15, wherein:
said algorithm determines the overall benefit to said system for a proposed trade of resources between partitions by considering both the beneficial and detrimental effects of the proposed trade.

17. In a data processing system configured to include multiple logical partitions, wherein resources of said system are selectively allocated among respective partitions, an apparatus comprising:
a first processing component for evaluating the allocation of resources to each of said partitions at a particular time, in order to select a partition having at least one resource considered to be of low desirability due to its level of locality with respect to said selected partition;
a second processing component for identifying each of the other partitions that has a resource matching said resource of low desirability;
a third processing component for determining the overall benefit of said system that would result from trading said resource of low desirability for the matching resource of each of said identified partitions; and
a fourth processing component for reallocating said resources to trade said resource of low desirability for the matching resource of the identified partition that is determined to provide the greatest overall benefit for said system, provided that at least some overall system benefit will result from said reallocation.

18. The apparatus of claim 17, wherein:
an entity is provided for managing allocation of resources with respect to said partitions, wherein said entity is provided with an algorithm for periodically evaluating allocation of resources to respective partitions, and for determining whether a proposed reallocation would provide an overall benefit to said partitioned system.

19. The apparatus of claim 18, wherein:
said algorithm determines the overall benefit to said system for a proposed trade of resources between partitions by considering both the beneficial and detrimental effects of the proposed trade.

20. The apparatus of claim 18, wherein:
said managing entity selectively comprises a Partition Load Manager, or a separate background process.

* * * * *